(12) United States Patent
Yamamoto

(10) Patent No.: US 8,876,151 B2
(45) Date of Patent: Nov. 4, 2014

(54) GARNISH MOUNTING APPARATUS

(75) Inventor: Kazuhito Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 77 days.

(21) Appl. No.: 13/821,495

(22) PCT Filed: Sep. 7, 2010

(86) PCT No.: PCT/JP2010/065282
§ 371 (c)(1),
(2), (4) Date: Mar. 7, 2013

(87) PCT Pub. No.: WO2012/032603
PCT Pub. Date: Mar. 15, 2012

(65) Prior Publication Data
US 2013/0168515 A1  Jul. 4, 2013

(51) Int. Cl.
  *B60R 21/16* (2006.01)
  *B60R 13/02* (2006.01)
  *F16B 5/12* (2006.01)
  *F16M 13/02* (2006.01)
  *F16B 5/06* (2006.01)

(52) U.S. Cl.
  CPC ............ *F16M 13/02* (2013.01); *B60R 13/0206* (2013.01); *F16B 5/123* (2013.01); *F16B 5/065* (2013.01); *F16B 5/128* (2013.01); *B60R 13/025* (2013.01)
  USPC ................... 280/728.3; 280/730.2; 296/39.1; 296/187.05

(58) Field of Classification Search
  USPC ............... 280/728.2, 728.3, 730.2; 296/39.1, 296/187.05
  See application file for complete search history.

(56) References Cited

U.S. PATENT DOCUMENTS

| 5,934,729 | A | 8/1999 | Baack | |
|---|---|---|---|---|
| 6,196,607 | B1 | 3/2001 | Gulisano | |
| 6,234,515 | B1 | 5/2001 | Iwanaga | |
| 6,431,585 | B1 * | 8/2002 | Rickabus et al. | 280/728.3 |
| 7,077,449 | B2 * | 7/2006 | Tokunaga | 296/39.1 |
| 7,273,227 | B2 * | 9/2007 | Kawai et al. | 280/730.2 |
| 7,338,068 | B2 * | 3/2008 | Kawai et al. | 280/728.2 |
| 7,374,200 | B2 * | 5/2008 | Ikeda et al. | 280/728.2 |
| 7,717,458 | B2 * | 5/2010 | Tsuge | 280/728.2 |

(Continued)

FOREIGN PATENT DOCUMENTS

| JP | 2001-026247 | 1/2001 |
|---|---|---|
| JP | 3633537 B2 | 1/2005 |
| JP | 2005-114124 | 4/2005 |

(Continued)

*Primary Examiner* — Toan To
(74) *Attorney, Agent, or Firm* — Oliff PLC

(57) ABSTRACT

A garnish mounting apparatus includes a rack formed at a back surface of the garnish and a tether clip for mounting the garnish to the body member at the rack. A slit is formed at the rack, and the tether of the clip extends through the slit. The tether and the slit-defining edge of the rack are movable relative to each other in a longitudinal direction of the slit and can be brought into engagement with each other in a direction perpendicular to the longitudinal direction of the slit. The clip has an engagement span for suppressing a rotational play of the garnish about a longitudinal axis of the garnish between a slit-penetrating portion of the tether and a contact portion of the clip with a bottom wall of the rack. A contact seat plane of the clip with the body member has a width for suppressing rotational play.

11 Claims, 7 Drawing Sheets

(56) References Cited

U.S. PATENT DOCUMENTS

| | | | |
|---|---|---|---|
| 7,931,295 B2 * | 4/2011 | Inui et al. | 280/730.2 |
| 8,046,880 B2 * | 11/2011 | Katoh et al. | 24/458 |
| 8,316,513 B2 * | 11/2012 | DeJong et al. | 24/293 |
| 8,316,514 B2 * | 11/2012 | Sano | 24/297 |
| 8,480,120 B1 * | 7/2013 | Fukuda et al. | 280/728.2 |
| 2003/0094828 A1 * | 5/2003 | Nagamoto | 296/39.1 |
| 2007/0075531 A1 | 4/2007 | Tsuge | |

FOREIGN PATENT DOCUMENTS

| | | |
|---|---|---|
| JP | 2006-103426 | 4/2006 |
| JP | 2006-176089 | 7/2006 |
| JP | 2007-98986 A | 4/2007 |
| JP | 2008-230363 | 10/2008 |

\* cited by examiner

GARNISH MOUNTING APPARATUS

The related field includes a pillar garnish mounting apparatus ("garnish mounting apparatus") for mounting a pillar garnish ("garnish") to a body member of a pillar ("body member").

BACKGROUND

Patent Document 1 discloses a garnish mounting apparatus 1 for mounting a garnish 3 to a body member 8 (e.g., an inner panel of a front pillar) by a clip 2. The garnish mounting apparatus 1 ("comparison apparatus") is a garnish mounting apparatus shown for comparison with exemplary implementations of broad inventive principles described herein.

In the prior art, a clip 2 is described that includes a tether clip having a tether 2a and an anchor 2b, and a usual clip not having a tether 2a and an anchor 2b. The front pillar extends obliquely in a frontward-downward direction of a vehicle, and a Curtain Shield Airbag ("CSA") 7. See FIG. 3. The CSA 7 extends along the front pillar from an upper portion of the front pillar to a midway portion of the front pillar spaced from the upper portion in the frontward-downward direction.

At a first front pillar portion where the CSA 7 extends beside the clip 2, a tether clip is used for the clip 2. At a second front pillar portion where the CSA 7 does not extend beside the clip 2 (and which is located more frontward-downward than the first front pillar portion along the front pillar), a usual clip is used for the clip 2. The clip which is an object of the exemplary implementations is a tether clip.

A mounting structure in the comparison apparatus 1 for mounting the garnish 3 to the body member 8 by the tether clip 2 is as follows:

The garnish 3 includes a rack 4 formed in the shape of a box and formed at a back surface of the garnish. A rectangular aperture 5 is formed at a bottom wall 4a of the rack 4, and the clip 2 extends through the aperture 5. A side surface of the rack 4 opposing the CSA is inclined toward the CSA 7 in a direction from the bottom wall 4a to the garnish 3 for easy removal of a die at the time of molding and for forming an embossment on the side surface.

The tether clip 2 includes the tether 2a bent in a direction perpendicular to a longitudinal direction of the garnish and in a width direction of the garnish, the anchor 2b formed at a tip of the tether 2a and bulged in the direction perpendicular to the longitudinal direction of the garnish, a flange 2c, a holding portion 2d for holding the bottom wall 4a of the rack between the flange 2c and the holding portion, an elastic lip 2e and an engagement hook 2f. The tether 2a and the anchor 2b are inserted into the rack 4 through the rectangular aperture 5. The clip 2 is fixed to the body member 8 by inserting a head 2g of the clip 2 through the aperture 6 formed at the body member 8 and holding an aperture-edge portion of the body member 8 between the elastic lip 2e and the engagement hook 2f.

An engagement strength of the engagement hook 2f with the body member 8 is larger than an engagement strength of the holding portion 2d with the bottom wall 4a of the rack. As a result, when the CSA 7 is expanded, the tether clip 2 is not removed from the body member 8, while the garnish 3 is moved relative to the clip 2 in a direction away from the body member 8. When the anchor 2b of the clip 2 engages the aperture-edge portion of the bottom wall 4a of the rack, the movement of the garnish 3 stops, and thereby the garnish 3 is prevented from scattering into a cabin of the vehicle. At the time of maintenance, the garnish 3 is necessarily removed from the body member 8 together with the clip. As a result, in some cases, the engagement hook 2f will be damaged and the aperture-defining edge of the body member 8 will be deformed. In such cases, it will be difficult to reuse the clip and it will be necessary to repair the deformed aperture defining-edge of the body member 8.

It is necessary to suppress a rotational movement of the garnish 3 relative to the body member 8 about a longitudinal axis of the garnish ("rotational play"). The rotational play of the garnish 3 is a summation of a rotational play at a contact seat plane 9 (a plane connecting the tips of a pair of elastically deformed lips 2e) of the elastic lip 2e relative to the body member 8 and a rotational play of the bottom wall 4a of the rack 4 relative to the flange 2c of the clip.

The rotational play at the contact seat plane 9 of the elastic lip 2e relative to the body member 8 is suppressed by selecting a width of the contact seat plane 9 in the width direction of the garnish perpendicular to the longitudinal direction of the garnish to be a predetermined width $W1p$, where $W1p$ is a dimension existing between about 14 mm-20 mm.

The rotational play of the bottom wall 4a of the rack relative to the flange 2c of the clip is suppressed by selecting a width of the contact surface of the bottom wall 4a of the rack with the flange 2c of the clip in the direction perpendicular to the longitudinal direction of the garnish to be a predetermined width $W2p$, where $W2p$ is nearly equal to $W1p$ and is a dimension existing between about 14 mm-20 mm.

Patent Document 1: Patent Publication JP 2006-176089

SUMMARY

There is a need for improving the structure of comparison apparatus 1 for suppressing a rotational play of the garnish 3 relative to the body member 8 about the longitudinal axis of the garnish, especially the structure for suppressing a rotational play between the rack 4 and the clip 2.

More particularly, in order to effectively suppress a rotational play of the bottom wall 4a of the rack relative to the flange 2c of the clip, it is desirable that the width $W2p$ of the contact surface of the bottom wall 4a of the rack with the flange 2c of the clip in the direction perpendicular to the longitudinal direction of the garnish is selected large. However, if the width $W2p$ of the contact surface is large, a width $W4p$ (when viewed from a driver) of the rack 4 of a box-type will be also large, resulting in a width $W3p$ (when viewed from a driver) of the garnish 3 also being large. As a result, the driver's field of vision will be partially intercepted by the garnish 3. Therefore, it is difficult to suppress a rotational play of the garnish 3 relative to the body member 8 without decreasing the field of vision.

An object of exemplary implementations of the broad inventive principles is to provide a garnish mounting apparatus capable of suppressing a rotational play of a garnish relative to a body member without decreasing a field of vision.

(1) A garnish mounting apparatus according to exemplary implementations comprises a rack formed at a back surface of a garnish and a clip for mounting the garnish to a body member at the rack.

The rack includes a bottom wall opposing the body member, a first side wall extending in a direction perpendicular to a longitudinal direction of the garnish and in a width direction of the garnish, and a pair of second side walls extending in the longitudinal direction of the garnish.

The clip includes a contact seat plane for contacting the body member, a flange extending parallel to the contact seat plane for contacting the bottom wall of the rack, an elastic tether extending from the flange toward the garnish, and an anchor provided at a tip of the tether.

A slit is formed at the rack and the tether of the clip extends through the slit formed at the rack.

The tether and a slit-defining edge of the rack oppose each other such that the tether and the slit-defining edge of the rack are movable relative to each other in a longitudinal direction of the slit and can be brought into contact with each other in a direction perpendicular to the longitudinal direction of the slit.

The clip has an engagement span between a slit-penetrating portion of the tether and a portion of the flange contacting with the bottom wall of the rack, in a direction perpendicular to the bottom wall of the rack, for suppressing a rotational play about a longitudinal axis of the garnish between the clip and the garnish.

(2) A garnish mounting apparatus according to item (1) above can further be structured such that the contact seat plane of the clip for contacting the body member has a width in a direction along the contact seat plane and in the direction perpendicular to the longitudinal direction of the garnish, for suppressing a rotational play about a longitudinal axis of the garnish between the clip and the body member.

More particularly, in a garnish mounting apparatus according to any one of items (1) or (2) above, a clearance between a side surface of the tether extending along the longitudinal direction of the garnish and the slit-defining edge of the rack extending along the longitudinal direction of the garnish will be defined as "d" (shown in FIG. 6) on each side of a center line of the tether ("$2d$" on both sides).

An engagement span between the slit-penetrating portion of the tether and the portion of the flange contacting with the bottom wall in a direction along the side wall extending between the bottom wall and the garnish will be defined as W2 (shown in FIG. 2).

A width of the contact seat plane of the clip for contacting the body member in the direction perpendicular to the longitudinal direction of the garnish and in the width direction of the garnish will be defined as W1 (shown in FIG. 1).

In order to suppress a rotational play of the garnish relative to the body member (e.g., in order to suppress the rotational play equal to or smaller than the rotational play in the comparison apparatus), the dimensions d, W2 and W1 are set as follows:

With respect to the dimension d, in item (1) above, "d" is set to be equal to zero or nearly equal to zero. When the dimension d is equal to zero, the tether and the slit-defining edge of the side wall slidingly make contact with each other. When the dimension d is nearly equal to zero but is not zero, it is desirable that a magnitude of the clearance d is equal to or smaller than 0.25 mm, and more desirably, is in the range of 0.05 mm-0.2 mm, and even more desirably, is nearly equal to 0.1 mm. The phrase, "nearly equal to" means to allow a deviation of ±10% here (the same, hereinafter).

With respect to the dimension W2, in item (1) above, it is desirable that W2 (a dimension in a direction perpendicular to the flange in the apparatus according to the exemplary implementations) is set to be nearly equal to W2$p$ (a dimension in a direction parallel to the flange in the comparison apparatus), or equal to or larger than W2$p$.

Since the dimension W2$p$ is nearly equal to W1$p$ (as mentioned in the explanation of the comparison apparatus) and the dimension W1$p$ is nearly equal to W1 (as will be explained below), the dimension W2 is nearly equal to W1 (a width of the contact seat plane of the clip with the body member) or is set to be equal to or larger than W1 (i.e., W2≥W1).

Each of the dimensions W2$p$, W1$p$ and W1 is nearly equal to or larger than 14 ram and nearly equal to or smaller than 20 mm. Therefore, a lower limit for the dimension W2 is nearly equal to 14 mm. Since the slit extends in the direction perpendicular to the flange, a dimension for W2 can be set large without decreasing a dimension of the interior of the garnish in the direction parallel to the flange. An upper limit for the dimension W2 may exceed 20 mm, and may be set to be, for example, 50 mm, and 60 mm. As a result, W2≥W1, or "a lower limit for the dimension W2"≥14 mm and "an upper limit for the dimension W2"≥20 mm.

With respect to the dimension W1, in item (2) above, it is desirable that W1 is set to be nearly equal to W1$p$ or is set to be equal to or larger than W1$p$. W1$p$ can be nearly equal to or larger than 14 mm or can be nearly equal to or smaller than 20 min.

As a result, W1≥W1$p$, or 20 mm≥W1≥14 mm.

(3) A garnish mounting apparatus according to items (1) or (2) above can further be structured such that the tether of the clip is bent in the longitudinal direction of the garnish. The tether extends from an interior of the rack to an exterior of the rack.

(4) A garnish mounting apparatus according to any one of items (1)-(3) above can further be structured such that the tether has, at a root of the tether, a cross section in a shape of a rectangle. A dimension of the rectangle along the longitudinal direction of the garnish is smaller than a dimension of the rectangle along the direction perpendicular to the longitudinal direction of the garnish and along the width direction of the garnish.

(5) A garnish mounting apparatus according to any one of items (1)-(4) above can further be structured such that a clip mounting aperture is formed at the body member. The clip includes a head caused to extend through the clip mounting aperture, an engagement hook caused to engage a clip mounting aperture-defining edge of the body member, and an engagement releasing projection for releasing engagement of the engagement hook with the body member.

(6) A garnish mounting apparatus according to item (5) above can further be structured such that a pair of engagement hooks each defined by the engagement hook described above is provided at the clip such that the engagement hooks are arranged in the longitudinal direction of the garnish. A pair of engagement releasing projections each defined by the engagement releasing projection described above is provided at the clip such that the engagement releasing projections are arranged in the longitudinal direction of the garnish.

(7) A garnish mounting apparatus according to item (5) or (6) above can further be structured such that the clip includes a tongue which is connected to the head at a root of the tongue and is separated from the head and the flange except at the root of the tongue. The tongue extends from the root to a position of the flange.

The tongue is capable of being elastically deformed in a direction perpendicular to an axial center line of the head.

A pair of tongues each defined by the tongue is provided at the clip such that the tongues are arranged in the longitudinal direction of the garnish.

The engagement hook and the engagement releasing projection are fanned at the tongue. The engagement hook is located on a side closer to the root of the tongue than the engagement releasing projection.

(8) A garnish mounting apparatus according to any one of items (1)-(7) above can further be structured such that the body member is an inner panel of a front pillar of a vehicle. A portion of the inner panel located at a rear of the clip and in front of a weather strip is substantially flat.

(9) A garnish mounting apparatus according to any one of items (1)-(8) above can further be structured such that the rack is box-shaped. The rack has the bottom wall and three walls which include the first side wall extending in the direction perpendicular to the longitudinal direction of the garnish and the width direction of the garnish and the pair of second side walls extending in the longitudinal direction of the garnish.

(10) A garnish mounting apparatus according to any one of items (1)-(9) above can further be structured such that an opening defined only by the slit is provided at the first side wall extending in the direction perpendicular to the longitudinal direction of the garnish and in the width direction of the garnish. The slit has a constant width. The tether extends through the slit from the interior of the rack to the exterior of the rack.

(11) A garnish mounting apparatus according to any one of items (1)-(9) above can further be structured such that a pair of ribs extending in a direction parallel to the bottom of the rack are foamed at the pair of second side walls. The slit is defined between tips of the pair of the ribs and extends in the longitudinal direction of the garnish. The slit has a constant width. The tether extends through the slit. The tether extends from the interior of the rack to the exterior of the rack through an opening of the rack which opposes the first wall of the rack extending in the direction perpendicular to the longitudinal direction of the garnish, in the longitudinal direction of the garnish.

In the garnish mounting apparatus according to the exemplary implementations, a rotational play amount A of the garnish is a summation of a rotational play amount $A_1$ of the clip relative to the body member and a rotational play amount $A_2$ of the garnish relative to the clip. Thus, $A=A_1+A_2$.

Since d is defined as a clearance between the side surface of the tether extending along the longitudinal direction of the garnish at the slit-penetrating portion of the tether and the slit-defining edge of the rack extending along the longitudinal direction of the garnish and $W_2$ is defined as an engagement span between the slit-penetrating portion of the tether and the contact portion of the flange with the bottom wall. The rotational play amount $A_2$ of the garnish relative to the clip is $d/W_2$.

According to the garnish mounting apparatus of item (1) above, since the tether and the slit-defining edge of the rack oppose each other, the tether and the slit-defining edge of the rack are movable relative to each other in the longitudinal direction of the slit and can be brought into contact with each other in the direction perpendicular to the longitudinal direction of the slit. As a result, the rotational play amount $A_2$ of the garnish relative to the clip is suppressed. Thus, $A_2$, from the rotational play A of the garnish, can be suppressed.

More particularly, since the clearance d between the side surface of the tether extending along the longitudinal direction of the garnish and the slit-defining edge of the rack extending along the longitudinal direction of the garnish is zero or nearly equal to zero at the slit-penetrating portion of the tether, the rotational play amount of the garnish relative to the clip (i.e., $A_2=d/W_2$), is zero or nearly equal to zero.

According to the garnish mounting apparatus of item (1) above, an engagement span between a slit-penetrating portion of the tether and a portion of the flange contacting with the bottom wall of the rack is selected to be the engagement span $W_2$ which suppresses a rotational play between the clip and the garnish. As a result, a rotational play amount $A_2=d/W_2$ of the garnish relative to the clip can be suppressed. Thus, $A_2$, from among the rotational play amount A of the garnish, can be suppressed.

According to the garnish mounting apparatus of item (2) above, the contact seat plane of the clip for contacting the body member has a width $W_1$ in the direction along the contact seat plane and in the direction perpendicular to the longitudinal direction of the garnish for suppressing a rotational play about a longitudinal axis of the garnish between the clip and the body member. As a result, a rotational play amount $A_1$ between the clip and the body member in the direction perpendicular to the longitudinal direction of the garnish can be suppressed. Thus, $A_1$, from the rotational play amount A of the garnish, can be suppressed.

According to the garnish mounting apparatus of item (3) above, the tether of the clip is bent in the longitudinal direction of the garnish and extends from the interior of the rack to the exterior of the rack. Accordingly, width dimensions $W_4$ and $W_3$ (width dimensions when viewed from a driver) of the rack and the garnish in the direction perpendicular to the longitudinal direction of the garnish can be made smaller than the width dimensions $W_4p$ and $W_3p$ of the rack and the garnish of the comparison apparatus (FIG. 13), respectively. As a result, a field of vision can be improved.

According to the garnish mounting apparatus of item (4) above, the tether has, at the root of the tether, a cross section in the shape of a rectangle where a dimension of the rectangle extending along the longitudinal direction of the garnish is smaller than a dimension of the rectangle extending along the direction perpendicular to the longitudinal direction of the garnish. As a result, the tether can maintain a required deformability in the longitudinal direction of the garnish and in the direction away from the flange. Further, the tether can have the predetermined rigidity in the direction perpendicular to the longitudinal direction of the garnish so that the tether can effectively suppress a rotational play about the longitudinal axis of the garnish.

According to the garnish mounting apparatus of item (5) above, the clip includes the engagement hook and the engagement releasing projection for releasing engagement of the engagement hook with the body member. As a result, the garnish can be easily removed together with the clip from the body member by releasing the hook using the engagement releasing projection. When compared with the comparison apparatus, the body member and the clip are not damaged when the clip is removed. As a result, repair of the body member is not necessary and the clip can be used again.

According to the garnish mounting apparatus of item (6) above, the pair of engagement releasing projections is provided at the clip such that the engagement releasing projections are arranged in the longitudinal direction of the garnish. As a result, a tool such as radio pincers can be inserted in the garnish to reach the engagement releasing projections in the direction perpendicular to the longitudinal direction of the garnish and in the width direction of the garnish through a clearance caused between the body member and the width end of the garnish when the weather strip is removed. In this case, by directing the pinching direction of the tool to the longitudinal direction of the garnish, it is possible to easily pinch the engagement releasing projections by the tool and to easily remove the garnish from the body member.

Further, since the pair of engagement releasing projections is provided at the clip in the longitudinal direction of the garnish, the engagement releasing projections do not protrude in the direction perpendicular to the longitudinal direction of the garnish. As a result, the engagement releasing projections do not decrease space inside the garnish for disposing parts arranged beside the clip in the direction perpendicular to the longitudinal direction of the garnish.

According to the garnish mounting apparatus of item (7) above, the engagement hook and the engagement releasing projection are formed at the tongue. As a result, the engagement hook can be displaced toward the axial center line of the head by displacing the engagement releasing projection toward the axial center line of the head using the tool. Thus, the clip can be easily removed from the body member.

According to the garnish mounting apparatus of item (8) above, since the portion of the inner panel located at a rear of the clip and in front of a weather strip is substantially flat, it is possible to cause the tool such as radio pincers to reach the engagement releasing projection without interfering with a convex or concave portion of the inner panel.

According to the garnish mounting apparatus of item (9) above, since the rack has the pair of side walls extending in the longitudinal direction of the garnish, the rack is formed in the shape of a box defined by the three side walls and the bottom wall. As a result, the exemplary implementations can be easily applied to a garnish mounting apparatus having a box-type rack.

According to the garnish mounting apparatus of item (10) above, the slit is provided at the side wall extending in the direction perpendicular to the longitudinal direction of the garnish and the tether extends from the interior of the rack to the exterior of the rack through the slit. Thus, the apparatus according to item (10) above can be applied in a case where a member which may interfere with the tether and the anchor is not disposed in the longitudinal direction of the garnish and outside the side wall extending in the direction perpendicular to the longitudinal direction of the garnish and in the width direction of the garnish.

According to the garnish mounting apparatus of item (11) above, the tether extends through the slit formed between the ribs and extends from the interior of the rack to the exterior of the rack through the opening of the rack. Thus, the apparatus according to item (11) above can be applied in a case where a member which may interfere with the tether and the anchor is not disposed outside the opening of the rack in the longitudinal direction of the garnish.

DETAILED DESCRIPTION OF THE EMBODIMENTS

A garnish mounting apparatus according to the exemplary implementations of the broad inventive principles will be explained with reference to FIGS. 1-12.

Figure 11:
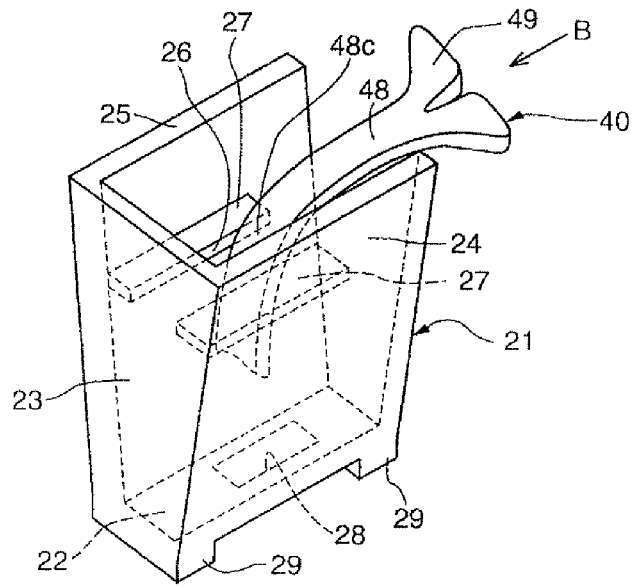
FIG. 11 is an oblique view of the rack and a portion of the clip of a garnish mounting apparatus according to the second exemplary implementation.
Figure 12:
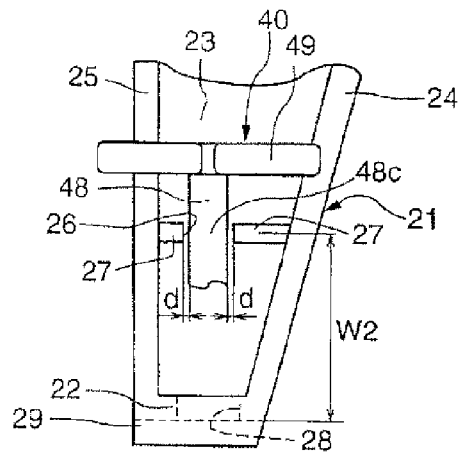
FIG. 12 is a front view of the rack and the portion of the clip of the apparatus of FIG. 11 viewed along arrow B of FIG. 11.

FIGS. 1-10 illustrate a first exemplary implementation, and FIGS. 11 and 12 illustrate a second exemplary implementation. Portions common to both of the exemplary implementations are denoted with the same reference numerals over the first exemplary implementation and the second exemplary implementation.

In the drawings, "FR" illustrates a front direction in a front-rear direction of a vehicle, "IN" illustrates an inward direction in a width direction of the vehicle, and "UP" illustrates an up direction in an up-down direction of the vehicle.

The garnish mounting apparatus 10 will be explained with reference to FIGS. 1-10.

First, a general structure of the garnish mounting apparatus 10 will be explained with reference to FIG. 1.

The garnish mounting apparatus 10 is an apparatus for mounting a garnish 20 to a body member 11 using a clip 40. The body member 11 is a member of a front pillar (which may be called as an "A-pillar") of a vehicle. The body member 11 includes an inner panel 11a, an outer panel 11b and a reinforcement 11c. A clip mounting aperture 17 is formed at a clip mounting portion of the inner panel 11a. The garnish 20 is mounted to the inner panel 11a at a position of the clip mounting aperture 17 using the clip 40.

The garnish 20 is an A-pillar garnish (which may be called simply as a "garnish").

The clip 40 is a tether clip having a tether 48. Reference numeral "40" will be used for the tether clip hereinafter.

The A-pillar extends in a frontward and downward direction relative to the vehicle. The garnish 20 is coupled to the body member 11 at a rear and upper portion of the A-pillar using the tether clip 40. The garnish 20 is coupled to the body member 11 at a front and lower portion of the A-pillar using a usual clip 40 which has neither a tether nor an anchor.

At a position of the tether clip 40, the CSA 12 extends to a position beside the clip 40, while at a position of the usual clip, the CSA does not extend to a position beside the clip 40.

At a space within the garnish 20, a wire harness, a drain hose, an antenna 13 and others are disposed in front of the tether clip 40, and the CSA 12 is disposed at the rear of the tether clip 40.

In front of and outside the garnish 20, a front glass 14 is disposed. Weather strips 15 and 16 are disposed at a position between the body member 11 and a rear end of the garnish 20 and at a position between the body member 11 and the front glass 14.

The tether clip 40 is coupled to the garnish 20 in a state that the garnish 20 is removed from the body member 11.

By inserting a head 44 of the clip 40 which is coupled to the garnish 20 into the clip mounting aperture 17, the garnish 20 is coupled to the body member 11 via the clip 40.

At a time of collision of the vehicle, the garnish 20 is pushed by an expanding CSA 12 and moves in a direction away from the body member 11. The CSA 12 develops and expands toward a rear of the vehicle through a clearance between the body member 11 and the garnish 20. In FIG. 1, reference numeral "12'" shows an expanded CSA, and "20'" shows a displaced garnish. During expansion of the CSA 12, the garnish 20 moves relative to the tether clip 40, while the tether clip 40 maintains to be coupled to the body member 11.

At a time of maintenance, the garnish 20 is removed from the body member 11 together with the clip 40.

A structure of the garnish mounting apparatus 10 according to a first exemplary implementation will be explained with reference to FIGS. 1-10.

Figure 1:
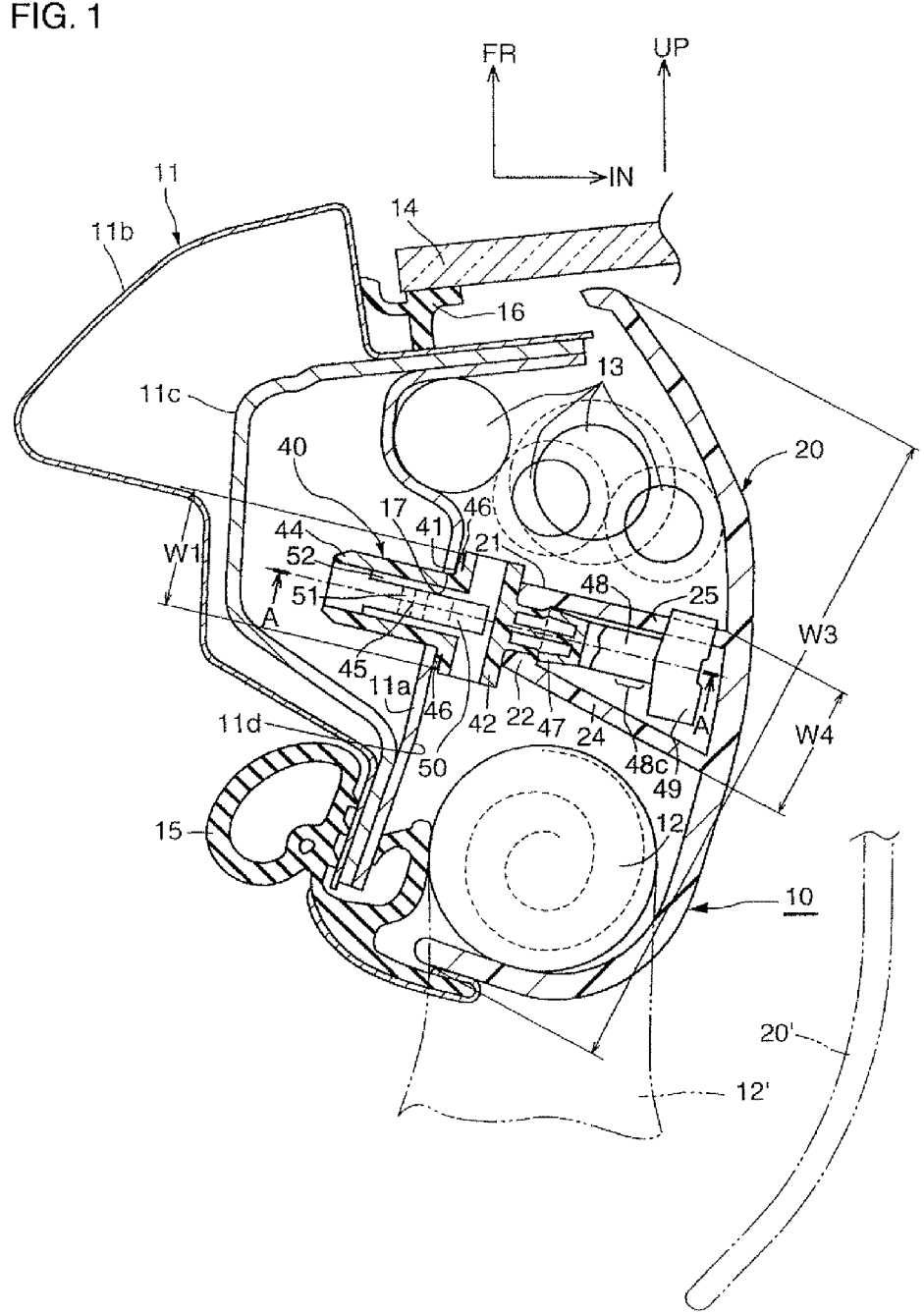
FIG. 1 is a cross-sectional view of a garnish mounting apparatus (which may be called simply as an "apparatus") taken along a plane perpendicular to a longitudinal direction of a garnish. The structures, except for a slit and a curve of a tether, can be applied to a second exemplary implementation of the broad inventive principles described herein (shown in FIGS. 11 and 12)

As illustrated in FIG. 1, the garnish mounting apparatus 10 includes a rack 21 formed at a back surface the garnish 20 and the clip 40. The rack 21 and the clip 40 are made from synthetic resin. The rack 21 is integrally formed with the garnish 20.

The clip 40 is a tether clip which includes a tether 48 having an elasticity and an anchor 49 formed at a tip of the tether 48.

The rack 21 is formed at the back surface of the garnish 20 locally in the longitudinal direction of the garnish.

As illustrated in FIGS. 1-8, the rack 21 includes a substantially rectangular bottom wall 22 opposing the body member 11 and a side surface 23 extending between the bottom wall 22 and the garnish 20 and extending in a direction perpendicular to the longitudinal direction of the garnish and a width direction of the garnish. The rack 21 further includes a pair of side walls 24 and 25 extending between the bottom wall 22 and the garnish 20 and in the longitudinal direction of the garnish. The pair of side walls 24 and 25 includes a side wall 24 on a side closer to the CSA 12 and a side wall 25 on a side further from the CSA 12. The side wall 25 is perpendicular or substantially perpendicular to the bottom wall 22. The side wall 24 is inclined relative to the bottom wall 22 such that the side wall 24 is inclined in a direction close to the CSA 12 and away from the bottom wall 22.

The rack 21 is a box-type rack having an interior which is surrounded by the bottom wall 22, the three side walls 23, 24 and 25, and the garnish 20, and which is open at a portion opposing the side wall 23 in the longitudinal direction of the garnish. A space surrounded by the bottom wall 22, the three side walls 23, 24 and 25, and the garnish 20 constructs an interior of the rack 21.

The interior of the rack 21 is open to an exterior of the rack 21 through an opening which opposes, in the longitudinal direction of the garnish, the side wall 23 extending in the direction perpendicular to the longitudinal direction of the garnish and the width direction of the garnish.

A slit 26 is formed at the rack 21. The slit 26 extends straight. The slit 26 has a constant width. The width of the slit 26 is equal to or larger than a width of the tether 48 in the same direction of the tether as the width direction of the slit. A center line of the slit 26 in the width direction of the slit is in a plane extending in the longitudinal direction of the garnish.

As illustrated in FIGS. 1-8, the slit 26 may be formed at the side wall 23 extending in the direction perpendicular to the longitudinal direction of the garnish and in the width direction of the garnish, or may be formed between ribs 27 constructing a portion of the rack 21 and formed at the pair of the side walls 24 and 25 extending in the longitudinal direction of the garnish.

The tether 48 of the clip 40 is bent in the longitudinal direction of the garnish and extends through the slit 26. A center line of the tether 48 in the width direction of the tether is in a plane extending in the longitudinal direction of the garnish. The width center line of the slit 26 and the width center line of the tether 48 are in the same plane extending in the longitudinal direction of the garnish as each other.

Tether 48 may be bent in a direction toward the side wall 23 as illustrated in FIGS. 1-6, or may be bent in a direction opposite the side wall 23 as illustrated in FIGS. 11 and 12. A portion of the tether 48 penetrating the slit 26 is called a slit penetrating portion 48c of the tether 48. The tether 48 extends from the interior of the rack 21 to the exterior of the rack 21. The anchor 49 is located outside the rack 21.

A width dimension of the slit 26 in the direction perpendicular to the longitudinal direction of the garnish is equal to or larger than a dimension of a width of the tether 48 (a long side of the rectangular cross section of the tether 48) in the direction perpendicular to the longitudinal direction of the garnish, and is smaller than a dimension of a width of the anchor 49 in the direction perpendicular to the longitudinal direction of the garnish. According to this structure, at the time of expansion or development of the CSA 12, the rack 21 can move relative to the clip 40. When the anchor 49 is brought into engagement with the rack 21 from the exterior of the rack 21, movement of the rack 21 relative to the clip 40 stops.

In more detail, at the time of development or expansion of the CSA 12 such as at a side impact of the vehicle, receiving pressure from the CSA 12, the garnish 20 moves in a direction away from the body member 11. A slit-defining edge of the rack 21 moves relative to the tether 48. As a result, as illustrated in FIG. 1, a space is formed between the moved garnish 20' and the body member 11. Through the space, the CSA 12 expands rearwards in a front-rear direction of the vehicle to a space between a head of a passenger and a side door, thereby protecting the head of the passenger. When the garnish 20 moves in the way away from the body member 11, the anchor 49 of the clip 40 is brought into engagement with the slit-defining edge of the rack 21 and stops a further movement of the garnish 20. As a result, the garnish 20 is prevented from scattering into a passenger space of the vehicle.

A rectangular aperture 28 is formed at the bottom wall 22 of the rack. The clip 40 extends through the rectangular aperture 28.

Figure 2:
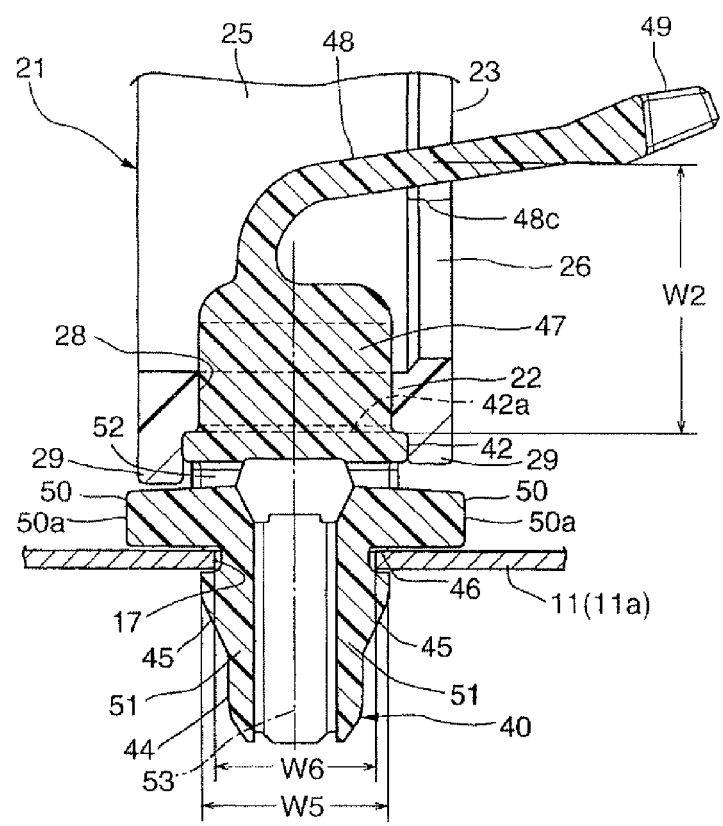
FIG. 2 is a cross-sectional view of a rack and a clip of the apparatus of FIG. 1 taken along a plane extending in the longitudinal direction of the garnish (a cross-sectional view taken along line A-A of FIG. 1)

As illustrated in FIG. 2, protrusions 29 protruding in the direction away from the garnish 20 are formed at opposite ends of the bottom wall 22 of the rack 21 in the longitudinal direction of the garnish. When the bottom wall 22 of the rack contacts a flange 42 of the clip, the protrusions 29 hold the bottom wall 22 of the rack between the protrusions 29 in the longitudinal direction of the garnish.

As illustrated in FIGS. 1-6, 9 and 10, the clip 40 includes the head 44 which is inserted through the clip mounting aperture 17 formed at the body member 11, a contact seat plane 41 contacted by the body member 11 (a plane connecting tips of a pair of lips 46 after a deformation), the flange 42 parallel to the contact seat plane 41, a holding portion 47 for holding the bottom wall 22 of the rack between the holding portion and the flange 42, the tether 48 extending from the holding portion 47 toward the garnish 20 and having an elasticity, and the anchor 49 provided at a tip of the tether.

The tether 48 has a rectangular cross section at a root of the tether 48 on a side of the holding portion 47. A dimension of the rectangular cross section along the longitudinal direction of the garnish is smaller than a dimension of the rectangular cross section along the direction perpendicular to the longitudinal direction of the garnish. Due to the rectangular cross section, the tether 48 is likely to be deformed in the longitudinal direction of the garnish, while the tether is unlikely to be deformed in the direction perpendicular to the longitudinal direction of the garnish. Because the structure of the tether 48 is likely to be deformed in the longitudinal direction of the garnish, the garnish 20 easily moves in the direction away from the body member 11 accompanied by an elastic deformation of tether 48 at the time of expansion of the CSA 12. Because the structure of the tether 48 is unlikely to be deformed in the direction perpendicular to the longitudinal direction of the garnish, a rotational play of the garnish 20 is effectively suppressed when a moment about a longitudinal axis of the garnish is loaded, and the tether 48 and the slit-defining edge of the rack 21 are brought into contact with each other.

The holding portion 47 is positioned inside the rack 21 and the anchor 49 is positioned outside the rack 21. The clip 40 extends through the slit 26 at the slit-penetrating portion 48c.

Figure 5:
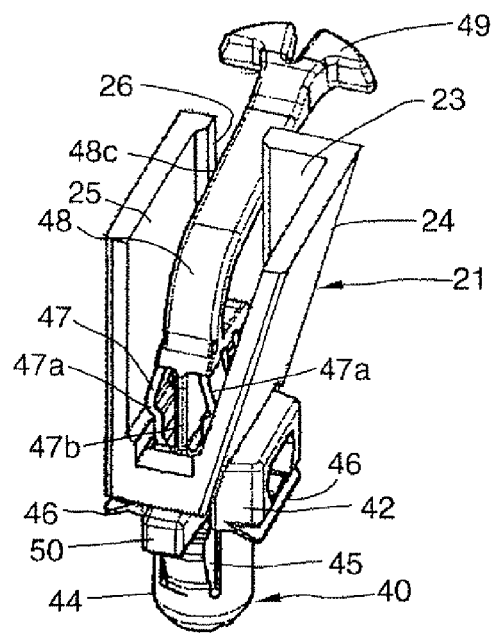
FIG. 5 is an oblique view of the apparatus of FIG. 4 viewed from a side of the CSA and from a side opposite the curve of the tether.

As illustrated in FIG. 5, the holding portion 47 has a pair of outer walls 47a elastically deformable in the direction perpendicular to the longitudinal direction of the garnish and a center wall 47b located between the outer walls. A portion between the outer walls 47a and the center wall 47b of the holding portion 47 is hollow.

When the clip 40 is mounted to the rack 21, the anchor 49 and the tether 48 are inserted inside the rack 21 through the rectangular aperture 28 formed at the bottom wall 22 of the rack. Then, the anchor 49 is removed through the slit 26 to outside the rack. Then, after causing the longitudinal direction of the rectangular cross section of the holding portion 47 to coincide with the longitudinal direction of the rectangular aperture 28 formed at the bottom wall 22 of the rack, the holding portion 47 is pushed into the rectangular aperture 28 from a side of tether 48. The elastic outer walls 47a of the holding portion 47 recede toward the center wall 47b so that the holding portion 47 can pass through the rectangular aperture 28. After passing through, the elastic outer walls 47a of the holding portion 47 elastically return to the original positions so that the bottom wall 22 of the rack is held between the flange 42 and the holding portion 47. The clip 40 is mounted to the rack 21. An engagement force of the holding portion 47 with the bottom wall 22 of the rack is set to be smaller than that of an engagement hook 45 with the body member 11 which will be described later. As a result, when a CSA developing pressure is loaded on the garnish 20, the elastic outer walls 47a can be elastically deformed toward the center wall 47b. The bottom wall 22 of the rack is disengaged from the holding portion 47 of the clip 40 so that the garnish 20 can move in the direction away from the body member 11.

The clip 40 further includes an elastic lip 46 extending in the longitudinal direction of the garnish at a portion of the clip closer to the head 44 (closer to the body member 11) than the flange 42 and at a side of the head 44 in the direction perpendicular to the longitudinal direction of the garnish. The elastic lip 46 is inclined toward a tip of the lip located in the direction perpendicular to the longitudinal direction of the garnish and toward the body member 11, so that the clip causes a reaction force when pressed against the body member 11.

The contact seat plane 41 of the clip 40 with the body member 11 is defined by a plane connecting the contact planes of the pair of lips 46 contacting the body member 11. The contact seat plane 41 is parallel to a clip mounting portion of the body member 11.

Figure 3:
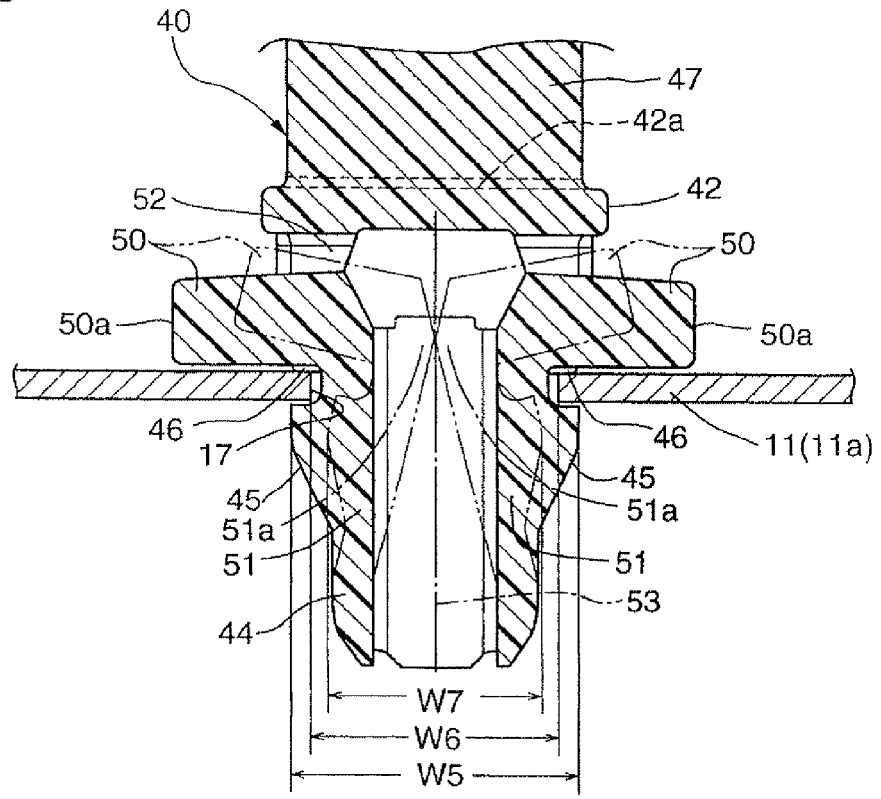
FIG. 3 is an enlarged cross-sectional view of a portion of the clip including an engagement hook and an engagement releasing projection, of the apparatus of FIG. 1.
Figure 4:
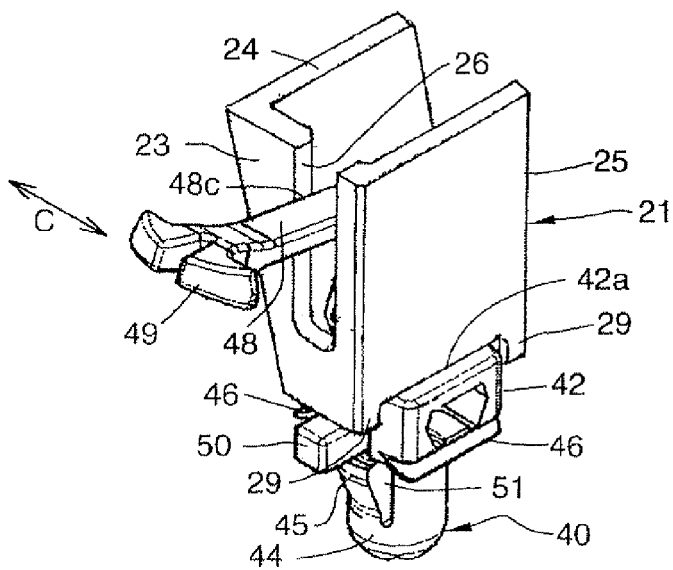
FIG. 4 is an oblique view of the rack and the clip of the apparatus of FIG. 1 viewed from a side opposite a CSA and from a side of the curve of the tether.

As illustrated in FIGS. 2 and 3, the clip 40 further includes an engagement hook 45 which engages the clip mounting aperture-defining edge of the body member when the clip 40 is mounted to the body member 11 and an engagement releasing projection 50 for releasing the engagement of the engagement hook with the body member.

A pair of engagement hooks 45 is provided at the clip 40 in the longitudinal direction of the garnish. A pair of engagement releasing projections 50 is provided at the clip 40 in the longitudinal direction of the garnish. Positions of the elastic lip 46 and the engagement hook 45 are offset by 90 degrees to each other about the head 44. The body member 11 is placed between the elastic lip 46 and the engagement hook 45 and is held by the elastic lip 46 and the engagement hook 45.

The clip 40 includes a tongue 51. The tongue 51 is connected to the head 44 at a root of the tongue 51, except where the root is separated from the head 44 and the flange 42 by a slit 52 in the shape of a U-letter. The tongue 51 extends from the root of the tongue 51 to a position of the flange 42.

The tongue 51 is elastically deformable about the root in a direction perpendicular to an axial center line 53 of the head 44.

A pair of tongues 51 is provided at the clip 40 in the longitudinal direction of the garnish.

The engagement hook 45 and the engagement releasing projection 50 are formed at the tongue 51. The engagement hook 45 is formed at the tongue on a side closer to the root of the tongue 51 than the engagement releasing projection 50.

After the clip 40 is coupled to the rack 21, the garnish 20 is mounted to a clip mounting aperture-defining edge of the body member 11 at the clip 40. When the head 44 of the clip is inserted through the clip mounting aperture 17, the tongue 51, the engagement hook 45 and the engagement releasing projection 50 recede toward the axial centerline 53 of the head pushed by the clip mounting aperture-defining edge of the body member. After inserted, the tongue 51 returns to an original position by its elasticity. As a result, as illustrated in FIGS. 2 and 3, a width W5 between tips of the engagement hooks 45 is larger than a dimension W6 (shown in FIG. 2) of the clip mounting aperture 17 of the body member 11 in the longitudinal direction of the garnish so that the clip 40 cannot be removed from the clip mounting aperture-defining edge of the body member. This state is a usual use state of the clip 40.

An engagement force of an engagement hook 45 with the body member 11 is set to be larger than that of the holding portion 47 with the bottom wall 22 of the rack. Therefore, when the garnish 20 receives a development force of the CSA 12 at a time of a side impact of the vehicle, the rack 21 moves in a direction away from the flange 42 of the clip 40, while the clip 40 remains at the body member 11. When the rack 21 moves in the direction away from the flange 42, the rack 21 slides relative to the tether 48 at the slit-defining edge of the rack. When the anchor 49 is brought into engagement with the slit-defining edge of the side wall 23 of the rack, the movement of the rack 21 in the direction away from the flange 42 stops, so that the garnish 20 is prevented from scattering.

At a time of maintenance, it is necessary to take off the garnish 20 together with the clip 40 from the body member 11. At that time, the weather strip 15 is taken off from the body member 11 whereby a clearance between the body member 11 and an end of the garnish 20 is made. Then, by inserting a tool such as radio pincers through the clearance and pinching the pair of engagement releasing projections 50 by the tool, the clip 40 is taken off from the body member 11.

In more detail, in FIG. 3, when the pair of engagement releasing projections 50 is pinched by the tool (such as radio pincers) at tip surfaces 50a and recedes toward the axial center line 53 of the head, the pair of tongues 51 also recedes toward the axial center line 53 of the head and the pair of engagement hooks 51 recedes toward the axial center line 53 of the head. When the pair of tongues 51 recedes toward the axial center line 53 of the head and the tongues 51 contact each other at contact portions 51a, the pair of tongues 51 does not recede further toward the axial center line 53 of the head. When the tongues 51 contact each other at the contact portions 51a, the tongues 51 are at the most receded positions, and the engagement hooks 45 are also at the most receded positions. When the engagement hooks 45 are at the most receded positions, a width W7 between tips of the pair of engagement hooks 45 is smaller than a dimension W6 of the clip mounting aperture-defining edge of the body member 11 in the longitudinal direction of the garnish, so that the head 44 of the clip can be taken off from the body member 11.

At that time, since force does not act on either the engagement hooks 45 or the clip mounting aperture-defining edge of the body member, the clip 40 is not damaged and the clip mounting aperture-defining edge of the body member is not deformed. As a result, it is possible to use the clip 40 again and it is not necessary to repair the clip mounting aperture-defining edge of the body member 11.

As illustrated in FIG. 3, the tip surfaces 50a of the pair of engagement releasing projections 50 are substantially parallel to the axial center line 53 of the head when the clip is in the usual use state, and are inclined relative to the axial center line 53 of the head when the engagement releasing projections 50 are at the most receded positions.

Instead, the tip surfaces 50a of the pair of engagement releasing projections 50 may be inclined relative to the axial center line 53 of the head when the clip is in the usual use state, and may be substantially parallel to the axial center line 53 of the head when the engagement releasing projections 50 are at the most receding positions. By providing this structure, slippage of the radio pincers relative to the tip surfaces 50a of the pair of engagement releasing projections 50 when the tongues 51 are at the most receded positions can be prevented, so that pinching the pair of engagement releasing projections 50 by the radio pincers is stable.

In the embodiment of FIG. 1, a panel of the body member 11, to which the clip 40 is mounted, is the inner panel 11a of the front pillar. A portion 11d of the inner panel 11a, located at a rear of the clip 40 and in front of the weather strip 15, is substantially flat. The portion 11d of the inner panel 11a is required to be flat to such an extent that the portion 11d does not protrude to a line connecting the engagement releasing projection 50 and a center of a clearance between the body member 11 and the end of the garnish 20 caused when the weather strip 15 is removed and does not obstruct insertion of the tool such as radio pincers.

Next, a structure for suppressing a rotational play of the garnish 20 relative to the body member 11 about a longitudinal axis of the garnish (hereinafter, "rotational play") will be explained.

Figure 6:
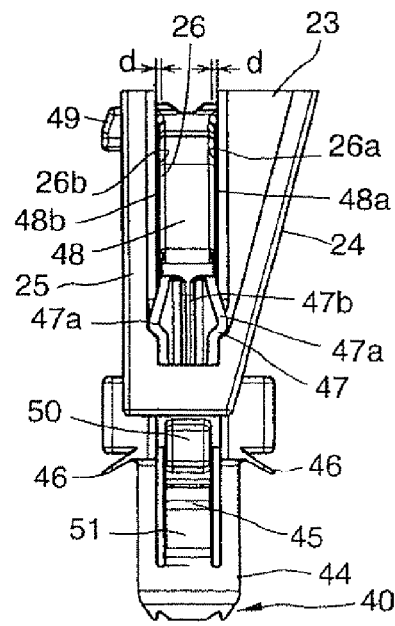
FIG. 6 is a side view of the apparatus of FIG. 5 viewed in the longitudinal direction of the garnish and from a side opposite the curve of the tether.
Figure 7:
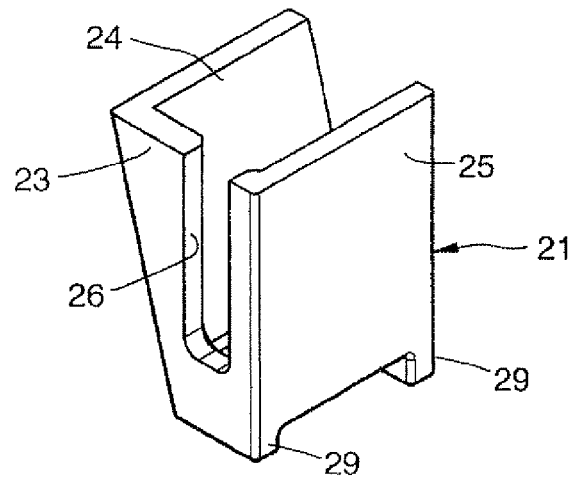
FIG. 7 is an oblique view of the rack of the apparatus of FIG. 1 viewed from the side opposite the CSA and from the side of the curve of the tether.
Figure 8:
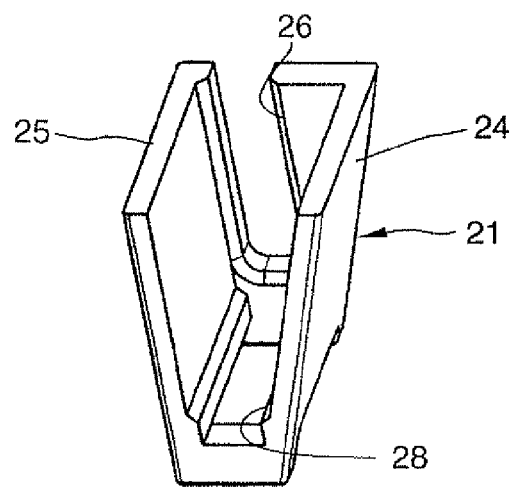
FIG. 8 is an oblique view of the rack of FIG. 7 viewed from the CSA and the side opposite the curve of the tether.
Figure 9:
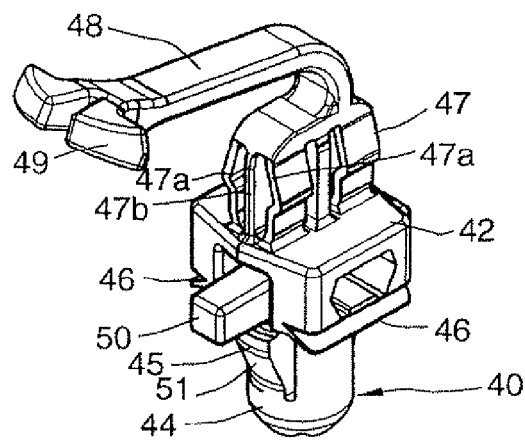
FIG. 9 is an oblique view of the clip of the apparatus of FIG. 1 viewed in the longitudinal direction of the garnish and from the side of the curve of the tether.
Figure 10:
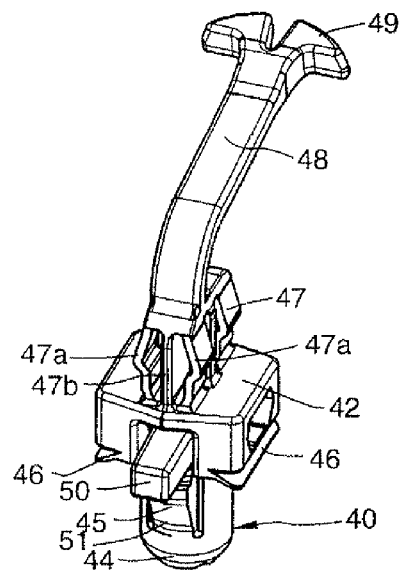
FIG. 10 is an oblique view of the clip of FIG. 9 viewed from the side opposite the curve of the tether.

At first, as illustrated in FIG. 6, "d" will be defined as a clearance between side surfaces 48a, 48b of the tether 48 extending along the longitudinal direction of the garnish and the slit-defining edges 26a, 26b of the rack extending along the longitudinal direction of the garnish on each side of a center line of the tether 48 ("2d" on both sides). In this case, the side surface 48a and the side surface 26a oppose each other, and the side surface 48b and the side surface 26b oppose each other.

Further, W2 will be defined as a distance (an engagement span) between a center of the slit-penetrating portion 48c of the tether 48 and the contact portion 42a of the flange 42 of the clip with the bottom wall 22 of the rack in the direction perpendicular to the flange 42.

Further, W1 will be defined as a width of the contact seat plane 41 of the clip 40 for contacting the body member 11 in the direction perpendicular to the longitudinal direction of the garnish and in the width direction of the garnish.

The tether 48 bent in the longitudinal direction of the garnish extends through slit 26 formed at the rack 21.

The sides 48a, 48b of the tether 28 extending along the longitudinal direction of the garnish and the sides 26a, 26b of the slit-defining edge of the rack extending along the longitudinal direction of the garnish are movable relative to each other in the longitudinal direction of the slit at the slit-penetrating portion 48c of the tether 48 and can be brought into contact with each other in the direction perpendicular to the longitudinal direction of the slit (i.e., in a rotational direction about the longitudinal axis of the garnish). In this case, the clearance d is set to be zero or nearly equal to zero. In the case where the clearance d is zero, the tether 48 slidably contacts the slit-defining edge of the side wall 23. In the case where the clearance d is nearly equal to zero but is not zero, in order to suppress the rotational play, it is desirable that a magnitude of the clearance d is equal to or smaller than 0.25 mm, and more desirably, is in the range of 0.05 mm-0.2 mm, and even more desirably, is nearly equal to 0.1 mm. Since the clearance d is set to be zero or nearly equal to zero, the rotational play is suppressed. Further, since the tether 48 is movable in the slit 26 in the longitudinal direction of the slit, the garnish 20 can move away from the body member 11 until the movement of the garnish 20 is stopped by the anchor 49.

As illustrated in FIG. 2, the clip 40 has an engagement span W2 between a center of the slit-penetrating portion 48c of the tether 48 and the contacting portion (seat surface) 42a of the flange 42 with the bottom wall 22 of the rack, in the direction in which the side surface 23 extends between the bottom wall 22 of the rack and the garnish 20 (i.e., in the direction perpendicular to the flange 42), for suppressing a rotational play amount A2 about the longitudinal axis of the garnish between the clip 40 and the garnish 20.

In order to suppress the rotational play amount A2, it is desirable that W2 (a dimension in the direction perpendicular to the flange 42 in the apparatus according to the first exemplary implementation) is set to be substantially equal to W2p (a dimension in the direction parallel to the flange 2c in the comparison apparatus 1), or equal to or larger than W2p. Since W2p is substantially equal to W1p (as was described in the explanation of the comparison apparatus 1) and W1p is substantially equal to W1 (as will be explained below), the engagement span W2 is set to be substantially equal to W1 (a dimension of the width of the contact seat plane 41 of the clip 40 with the body member 11 in the direction perpendicular to the longitudinal direction of the garnish), or is set to be equal to or larger than W1 (i.e., W2≥W1).

Each of the dimensions W2p, W1p and W1 is nearly equal to or larger than 14 mm or nearly equal to or smaller than 20 mm. Therefore, a lower limit for the dimension W2 is nearly equal to 14 mm. Since the slit 26 extends in the direction perpendicular to the flange 42, W2 can be set to a large dimension without decreasing the dimension of the interior of the garnish in the direction parallel to the flange. An upper limit for the dimension W2 may exceed 20 mm, and may be set to be, for example, 50 mm, and 60 mm. As a result, W2≥W1, or a lower limit for the dimension W2)≥14 mm and (an upper limit for the value W2)≥20 mm.

The contact seat plane 41 of the clip 40 for contacting the body member 11 has the width W1, in the direction along the contact seat plane 41 and in the direction perpendicular to the longitudinal direction of the garnish, for suppressing a rotational play amount A1 about a longitudinal axis of the garnish between the clip 40 and the body member 11.

It is desirable that W1 is set to be substantially equal to W1p of the comparison apparatus 1 or is set to be equal to or larger than W1p. W1p is nearly equal to or larger than 14 mm and nearly equal to or smaller than 20 mm. As a result, W1≥W1p, or 20 mm≥W1≥14 mm.

The structures described above are applicable to both the first exemplary implementation (shown in FIGS. 1-10) and the second exemplary implementation (shown in FIGS. 11 and 12).

The first exemplary implementation (FIGS. 1-10) further includes the following structures:

The slit 26 is provided at the side wall 23 extending in the direction perpendicular to the longitudinal direction of the garnish and in the width direction of the garnish. The slit 26 has a constant width over an entire length of the slit 26. The side wall 23 and the slit 26 extend in the direction perpendicular to the bottom wall 22. The slit 26 extends from an end of the side wall 23 on a side of the garnish 20 to the bottom wall 22 or to a vicinity of the bottom wall 22.

The tether 48 of the clip 40 is bent toward the side wall 23 and extends from an interior of the rack 21 to an exterior of the rack 21 through the slit 26.

In the first exemplary implementation, the garnish 20 is mounted to the body member 11 according to the following steps:

First, the clip 40 is coupled to the garnish 20. When coupling the clip 40 to the rack 21 of the garnish, a width direction of the anchor 49 (i.e., direction C in FIG. 4) is caused to coincide with the longitudinal direction of the rectangular aperture 28 of the bottom wall 22 of the rack, and the anchor 49 is put into the rack 21 through the rectangular aperture 28 of the bottom wall 22 of the rack. Then, the width direction of the anchor 49 is caused to coincide with the longitudinal direction of the slit 26, and the anchor 49 is put out from the rack 21 through the slit 26. Then, the clip 40 is rotated by 90 degrees relative to the garnish 20 so that the width direction of the anchor 49 is directed to the direction perpendicular to the longitudinal direction of the slit. Then, the holding portion 47 is installed to the bottom wall 22 of the rack to hold the rectangular aperture-defining edge of the bottom wall.

Then, the garnish 20 coupled with the clip 40 is mounted to the body member 11. At that time, the head 44 of the clip is pushed into the clip mounting aperture 17 formed at the body member 11 from the side of the garnish 20, and by forcing the engagement hook 45 to recede toward the axial center line 53 of the head, the head 44 of the clip is caused to extend through the clip mounting aperture 17 formed at the body member 11. When the engagement hook 45 has passed through the clip mounting aperture 17 formed at the body member 11, the engagement hook 45 returns to the original position due to the elasticity of the engagement hook and engages the clip mounting aperture-defining edge of the body member. By the above-described steps, the garnish 29 coupled with the clip 40 is mounted to the body member 11.

At the time of expansion of the CSA 12, the garnish 20 is moved in the direction away from the body member 11. Since the engagement force of the engagement hook 45 with the body member 11 is set to be larger than the engagement force of the holding portion 47 with the bottom wall 22 of the rack, the bottom wall 22 of the rack elastically deforms the holding portion 47 and passes through the holding portion 47, while the clip 40 continues to engage the body member 11. The movement of the garnish 20 relative to the body member 11 stops when the anchor 49 is brought into engagement with the rack 21 from an outside of the rack 21.

At the time of maintenance, the garnish 20 is removed from the body member 11 together with the clip 40. First, the weather strip 15 is removed. Then, a tool is inserted through the clearance formed between the end of the garnish 20 and the body member 11. Using the tool, the engagement releasing projection 50 is displaced toward the axial center line 53 of the head, so that engagement hook 45 also is displaced toward the axial center line 53 of the head. Maintaining the shape, the clip 40 is taken out from the body member 11. Since the clip 40 is not forced to be removed, the clip mounting aperture-defining edge of the body member 11 is not deformed, and the engagement hook 45 of the clip 40 is not damaged. As a result, it is possible to use the clip 40 again.

In the second exemplary implementation (FIGS. 11 and 12), in addition to the above-described structures commonly applicable to the embodiment of the first exemplary implementation and the second exemplary implementation, the apparatus includes the following structures:

The slit 26 to be provided at the rack 21 is formed between ribs 27 formed at the side walls 24 and 25 extending in the longitudinal direction of the garnish. The ribs 27 extend parallel to the bottom wall 22 of the rack. The slit 26 is a space defined between a tip of the rib 27 formed at the side wall 24 and a tip of the rib 27 formed at the side wall 25. The tether 48 extends through the slit 26. The tether 48 is bent in the longitudinal direction of the garnish and in a direction away from the side wall 23. The tether 48 extends through the opening of the rack 21 from the interior of the rack 21 to the exterior of the rack 21. A clearance between the tether 48 and the tip of the rib 27 defines the dimension "d" (shown in FIG. 12).

In the second exemplary implementation, the garnish 20 is mounted to the body member 11 in the following way:

First, the clip 40 is coupled to the garnish 20. When coupling the clip 40 to the rack 21 of the garnish, a width direction of the anchor 49 is caused to coincide with the longitudinal direction of the rectangular aperture 28 of the bottom wall 22 of the rack, and the anchor 49 is put into the rack 21 through the rectangular aperture 28 of the bottom wall 22 of the rack. Then, the width direction of the anchor 49 is caused to coincide with the longitudinal direction of the slit 26, and the anchor 49 is caused to extend through the slit 26 and put out from the rack 21 through the opening. Then, the clip 40 is rotated by 90 degrees relative to the garnish 20 so that the width direction of the anchor 49 is directed to the direction perpendicular to the longitudinal direction of the slit. Then, the holding portion 47 is installed to the bottom wall 22 of the rack to hold the rectangular aperture-defining edge of the bottom wall.

Then, the garnish 20 coupled with the clip 40 is mounted to the body member 11. Mounting of the clip 40 to the body member 11 is the same as that in the first exemplary implementation.

During expansion of the CSA 12, the garnish 20 is moved relative to the clip 40. Since the engagement force of the engagement hook 45 with the body member 11 is set to be larger than the engagement force of the holding portion 47 with the bottom wall 22 of the rack, the bottom wall 22 of the rack elastically deforms the holding portion 47 and passes through the holding portion 47, while the clip 40 continues to engage the body member 11. The movement of the garnish 20 relative to the body member 11 stops when the anchor 49 is brought into engagement with ends of the side walls 24 and 25 or slit-defining edges of the ribs.

At the time of maintenance, the garnish 20 is removed from the body member 11 together with the clip 40. The operations are the same as those of the above-described first exemplary implementation.

Other structures of the alteration are the same as those of the first exemplary implementation illustrated in FIGS. 1-10.

Next, operations and technical advantages of the first exemplary implementation will be explained.

First, a rotational play of the garnish 20 is suppressed.

The rotational play amount A of the garnish 20 is a summation of a rotational play amount A1 of the clip 40 relative to the body member 11 and a rotational play amount A2 of the garnish 20 relative to the clip 40. Thus, A=A1+A2.

Since "d" is defined as the clearance between the side surfaces 48a, 48b of the tether 48 extending along the longitudinal direction of the garnish at the slit-penetrating portion 48c of the tether 48 and the slit-defining edges 26a, 26b of the rack extending along the longitudinal direction of the garnish, and W2 is defined as the engagement span between the slit-penetrating portion 48c of the tether 48 and the contact portion 42a of the flange 42 with the bottom wall 22, the rotational play amount A2 of the garnish 20 relative to the clip 40 is d/W2.

The clearance d between the side surfaces 48a, 48b of the tether 48 extending along the longitudinal direction of the garnish and the slit-defining edges 26a, 26b of the rack extending along the longitudinal direction of the garnish is zero or nearly equal to zero at the slit-penetrating portion 48c of the tether 48. As a result, the rotational play amount of the garnish 20 relative to the clip 40 (i.e., A2=d/W2) is zero or nearly equal to zero. Thus, A2 among the rotational play amount A of the garnish 20 can be suppressed.

Further, the engagement span between the slit-penetrating portion 48c of the tether 48 and the contacting portion 42c of the flange 42 with the bottom wall 22 of the rack is selected to be the engagement span W2 which suppresses the rotational play amount A2 between the clip 40 and the garnish 20 (W2 is equal to or larger than, for example, W2p). As a result, the rotational play amount A2=d/W2 of the garnish 20 relative to the clip 40 can be suppressed as compared with that in the comparison apparatus. Thus, A2 among the rotational play amount A of the garnish 20 can be suppressed.

Further, the contact seat plane 41 of the clip 40 for contacting the body member 11 has a width W1 in a direction along the contact seat plane 41 and in the direction perpendicular to the longitudinal direction of the garnish for suppressing the rotational play amount A1 about a longitudinal axis of the garnish between the clip 40 and the body member 11 (W1 is equal to or larger than, for example, W2p). As a result, the rotational play amount A1 between the clip 40 and the body member 11 in the direction perpendicular to the longitudinal direction of the garnish can be suppressed as compared with that in the comparison apparatus. Thus, A1 among the rotational play amount A of the garnish 20 can be suppressed.

Further, a field of vision is improved.

Figure 13:
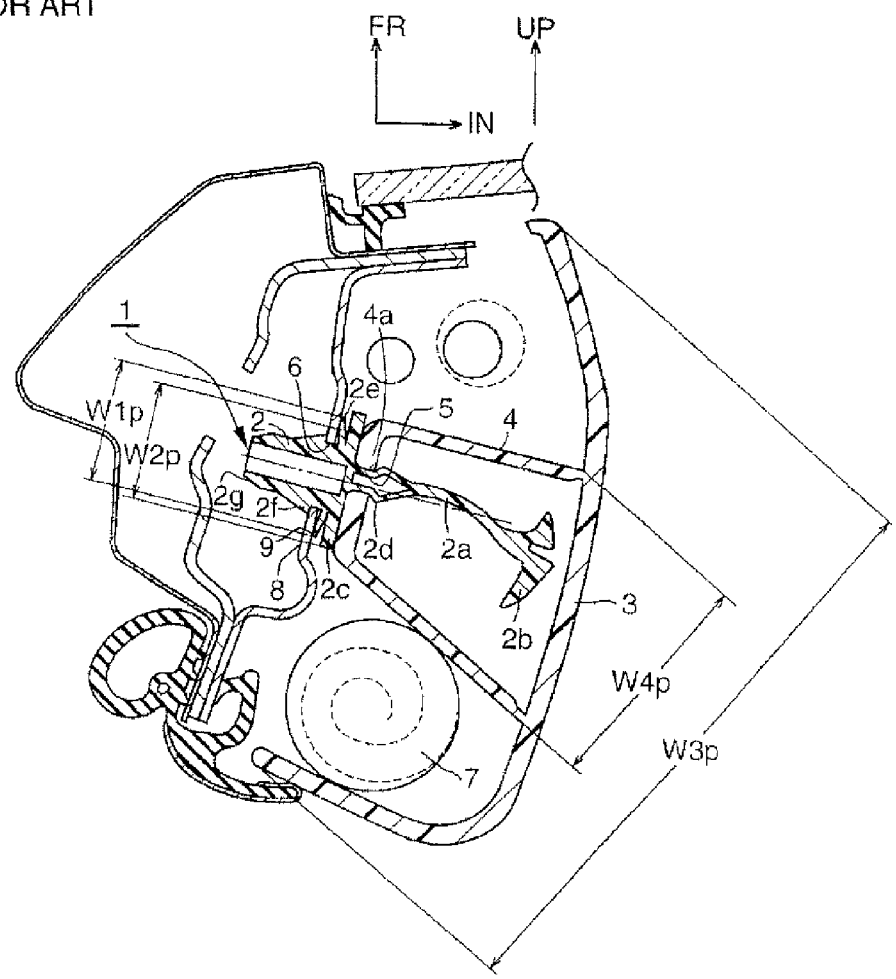
FIG. 13 is a cross-sectional view of a comparison garnish mounting apparatus (not included in the exemplary implementations) taken along a plane extending in a direction perpendicular to a longitudinal direction of the garnish.

Since the tether 48 is bent in the longitudinal direction of the garnish and extends from the interior of the rack 21 to the exterior of the rack 21, the width dimension W4 of the rack 21 in the direction perpendicular to the longitudinal direction of the garnish and the width dimension W3 of the garnish 20 in the direction perpendicular to the longitudinal direction of the garnish can be made smaller than the width dimensions W4p and W3p of the rack 4 and the garnish 3 of the comparison apparatus 1 (FIG. 13), respectively, in the case where the tether 2a is bent in the direction perpendicular to the longitudinal direction of the garnish and is housed in the rack 4. The dimensions W4 and W3 are dimensions when viewed from a driver.

As a result, the width dimension of the rack 21 in the direction parallel to the contact seat plane 41 and at a position beside a center of the CSA 12 is decreased to 40%-70% (for example, about 50%) of a corresponding width dimension of the rack of the comparison apparatus 1. As a result, the field of vision is improved.

Further, the tether 48 has, at the root of the tether 48, the cross section in the shape of a rectangle where a dimension of the rectangle along the longitudinal direction of the garnish is smaller than a dimension of the rectangle along the width direction of the garnish perpendicular to the longitudinal direction of the garnish. As a result, the tether 48 can maintain a deformability required to the tether 48 in the longitudinal direction of the garnish at the time of expansion of the CSA. Further, the tether 48 can have a rigidity in the direction perpendicular to the longitudinal direction of the garnish (larger than a rigidity in the longitudinal direction of the garnish) so that the tether can effectively suppress the rotational play amount A2 about the longitudinal axis of the garnish.

Further, since the clip 40 includes the engagement hook 45 and the engagement releasing projection 50 for releasing engagement of the engagement hook 45 with the body member 11, the garnish 20 can be easily removed together with the clip 40 by releasing the engagement hook 45 from the body member 11 using the engagement releasing projection 50. When compared with the comparison apparatus 1 where the clip 2 is forced to be removed from the body member 8, the body member 11 and the clip 40 are not damaged when the clip 40 is removed. As a result, the clip 40 can be used again.

Further, since the pair of engagement releasing projections 50 is provided at the clip 40 such that the engagement releasing projections 50 are arranged in the longitudinal direction of the garnish, the tool (such as radio pincers) can be inserted into the interior of the garnish to reach the engagement releasing projections 50 in the width direction of the garnish perpendicular to the longitudinal direction of the garnish through the clearance caused between the body member 11 and the width end of the garnish 20 when the weather strip 15 is removed. At that time, by directing the pinching direction of the tool to the longitudinal direction of the garnish, it is possible to easily pinch the engagement releasing projections 50 by the pair of pinching portions of the tool. When the engagement releasing projections 50 are pinched, the pair of engagement hooks 45 is elastically deformed toward the axial center line 53 of the head. As a result, as illustrated in FIG. 3, a span W7 between outer ends of the pair of engagement hooks 45 becomes smaller than dimension W6 (FIGS. 2 and 3) of the clip mounting aperture-defining edge of the body member 11 and the garnish 20 can be easily removed from the body member 11.

In a case where the tip surfaces 50a of the pair of engagement releasing projections 50 are inclined relative to the axial center line 53 of the head and become substantially parallel to the axial center line 53 of the head when the engagement releasing projections 50 are pinched and pushed by the tool, slippage of the tool relative to the tip surfaces 50a of the pair of engagement releasing projections 50 at the last stage of the pinching can be prevented, so that pinching the pair of engagement releasing projections 50 by the tool is stable.

Further, since the tether 48 is bent in the longitudinal direction of the garnish to extend to the exterior of the rack 21 and the pair of engagement releasing projections 50 is provided at the clip 40 in the longitudinal direction of the garnish, tether 48 and the engagement releasing projections 50 do not protrude from the clip 40 in the direction perpendicular to the longitudinal direction of the garnish.

As a result, the tether 48 and the engagement releasing projections 50 do not decrease a space inside the garnish 20 for disposing parts arranged beside the clip 40 in the direction perpendicular to the longitudinal direction of the garnish, such as the CSA 12, a drain hose and a wire harness for an antenna 13, etc.

Further, since the engagement hook 45 and the engagement releasing projection 50 are formed at the tongue 51, the engagement hook 45 can be displaced toward the axial center line 53 of the head by only displacing the engagement releasing projection 50 toward the axial center line 53 of the head using the tool. As a result, the clip 40 can be removed from the body member 11.

Further, since the portion 11d of the inner panel 11a located at a rear of the clip 40 and in front of the weather strip 15 is substantially flat, it is possible to cause the tool such as radio pincers to reach the engagement releasing projection 50 without interfering with a convex or concave portion of the inner panel 11a.

Further, since the rack 21 has the pair of side walls 24 and 25 extending in the longitudinal direction of the garnish, the first exemplary implementation can be easily applied to the box-type rack 4 of the comparison apparatus 1. However, the width of the box-type rack 21 of the present exemplary implementation in the direction perpendicular to the longitudinal direction of the garnish is about half of the width of the box-type rack 4 of the comparison apparatus 1. Therefore, the width of the garnish 20 is decreased.

The above operations and technical advantages are applicable to both the first exemplary implementation illustrated in FIGS. 1-10 and the second exemplary implementation illustrated in FIGS. 11 and 12.

The first exemplary implementation illustrated in FIGS. 1-10 further has the following operations and technical advantages:

Since the slit 26 is provided at the side wall 23 extending in the direction perpendicular to the longitudinal direction of the garnish and in the width direction of the garnish, and the tether 48 is bent toward the side wall 23 and extends from the interior of the rack 21 to the exterior of the rack 21 through the slit 26, at the time of expansion of the CSA 12 the anchor 49 is brought into engagement with the slit-defining edge of the rack from an outside of the side wall 23.

It is desirable that the apparatus illustrated in FIGS. 1-10, according to the first exemplary implementation is used in a case where parts, such as a CSA mounting clip (not shown) which may interfere with the tether 28 and the anchor 49, are not disposed outside the side wall 23 in the longitudinal direction of the garnish and at a vicinity of the side wall 23.

In addition to the above-described operations and technical advantages applicable to both of exemplary implementations, the second exemplary implementation illustrated in FIGS. 11 and 12 further has the following operations and technical advantages:

Since the tether 48 extends through the slit 26 formed between the ribs 27 and extends from the interior of the rack 21 to the exterior of the rack 21 through the opening of the rack 21, at the time of expansion of the CSA 12, the anchor 49 is brought into engagement with the end surfaces of the pair of side walls 24 and 25 extending in the longitudinal direction of the garnish from an outside of the opening. In a case where a space between the pair of the side walls 24 and 25 is wide and the anchor 49 enters the space between the pair of the side walls 24 and 25, at the time of expansion of the CSA 12, the anchor 49 is brought into engagement with the slit-defining edges of the ribs 27.

It is desirable that the apparatus 10 illustrated in FIGS. 11 and 12, according to the second exemplary implementation is used in a case where parts, such as a CSA mounting clip (not shown) which may interfere with the tether 28 and the anchor 49, are not disposed outside the opening in the longitudinal direction of the garnish and at a vicinity of the opening.

The invention claimed is:

1. A garnish mounting apparatus comprising:
   a clip for mounting a garnish to a body member at a rack, the rack formed at a back surface of the garnish, the rack including (a) a bottom wall opposing the body member; (b) a first side wall extending in a direction perpendicular to a longitudinal direction of the garnish and in a width direction of the garnish; and (c) a pair of second side walls extending in the longitudinal direction of the garnish, the clip including:
   a contact seat plane for contacting the body member;
   a flange extending parallel to the contact seat plane, the flange configured to contact the bottom wall of the rack;
   an elastic tether extending from the flange toward the garnish; and
   an anchor provided at a tip of the tether;
   wherein a slit is formed at the rack, the tether of the clip extending through the slit formed at the rack;
   wherein the tether and a slit-defining edge of the rack oppose each other such that the tether and the slit-defining edge of the rack are movable relative to each other in a longitudinal direction of the slit and can be brought into contact with each other in a direction perpendicular to the longitudinal direction of the slit; and
   wherein the clip has an engagement span between a slit-penetrating portion of the tether and a portion of the flange contacting with the bottom wall of the rack, in a direction perpendicular to the bottom wall of the rack, for suppressing a rotational play about a longitudinal axis of the garnish between the clip and the garnish.

2. The garnish mounting apparatus according to claim 1, wherein the contact seat plane of the clip for contacting the body member has a width in a direction along the contact seat plane and in the direction perpendicular to the longitudinal direction of the garnish for suppressing a rotational play about a longitudinal axis of the garnish between the clip and the body member.

3. The garnish mounting apparatus according to claim 1, wherein the tether of the clip is bent in the longitudinal direction of the garnish and extends from an interior of the rack to an exterior of the rack.

4. The garnish mounting apparatus according to claim 1, wherein the tether has, at a root of the tether, a cross section in a shape of a rectangle where a dimension of the rectangle along the longitudinal direction of the garnish is smaller than a dimension of the rectangle along the direction perpendicular to the longitudinal direction of the garnish and along the width direction of the garnish.

5. The garnish mounting apparatus according to claim 1, wherein:
   a clip mounting aperture is formed at the body member, and the clip includes a head configured to extend through the clip mounting aperture, an engagement hook configured to engage a clip mounting aperture-defining edge of the body member, and an engagement releasing projection for releasing engagement of the hook with the body member.

6. The garnish mounting apparatus according to claim 5, wherein a pair of engagement hooks each defined by the engagement hook is provided at the clip such that the engagement hooks are arranged in the longitudinal direction of the garnish, and a pair of engagement releasing projections each defined by the engagement releasing projection is provided at the clip such that the engagement releasing projections are arranged in the longitudinal direction of the garnish.

7. The garnish mounting apparatus according to claim 5, wherein:
- the clip includes a tongue which is connected to the head at a root of the tongue and is separated from the head and the flange except at the root of the tongue, the tongue extending from the root to a position of the flange,
- the tongue is capable of being elastically deformed in a direction perpendicular to an axial center line of the head,
- a pair of tongues each defined by the tongue is provided at the clip such that the tongues are arranged in the longitudinal direction of the garnish, and
- the hook and the engagement releasing projection are formed at the tongue, and the hook is located on a side closer to the root of the tongue than the engagement releasing projection.

8. The garnish mounting apparatus according to claim 1, wherein the body member is an inner panel of a front pillar of a vehicle, and a portion of the inner panel located at a rear of the clip and in front of a weather strip is substantially flat.

9. The garnish mounting apparatus according to claim 1, wherein the rack is formed in a shape of a box defined by the bottom wall and three walls which include the first side wall extending in the direction perpendicular to the longitudinal direction of the garnish and in the width direction of the garnish and the pair of second side walls extending in the longitudinal direction of the garnish.

10. The garnish mounting apparatus according to claim 1, wherein an opening defined only by the slit is provided at the first side wall extending in the direction perpendicular to the longitudinal direction of the garnish and in the width direction of the garnish, the slit having a constant width, the tether extending through the slit from the interior of the rack to the exterior of the rack.

11. The garnish mounting apparatus according to claim 1, wherein a pair of ribs extending in a direction parallel to the bottom of the rack are formed at the pair of second side walls, the slit being defined between tips of the pair of the ribs and extending in the longitudinal direction of the garnish, the slit having a constant width, the tether extending through the slit, and the tether extending from the interior of the rack to the exterior of the rack through an opening of the rack which opposes the first wall of the rack extending in the direction perpendicular to the longitudinal direction of the garnish, in the longitudinal direction of the garnish.

* * * * *